United States Patent [19]

Fendt et al.

[11] Patent Number: 6,070,114
[45] Date of Patent: May 30, 2000

[54] DATA TRANSMISSION SYSTEM

[75] Inventors: Günter Fendt; Peter Hora; Norbert Müller; Gerhard Wagner, all of Schrobenhausen, Germany

[73] Assignee: Telefunken Temic microelectronic GmbH, Heilbronn, Germany

[21] Appl. No.: 08/941,363

[22] Filed: Sep. 30, 1997

[30] Foreign Application Priority Data

Oct. 18, 1996 [DE] Germany ............................ 196 43 013

[51] Int. Cl.[7] ............................ H04L 12/40; H02J 15/00; B60R 16/02
[52] U.S. Cl. ................................ 701/45; 307/10.1; 701/48
[58] Field of Search ....................... 701/45, 48; 307/10.1; 395/200.81

[56] References Cited

U.S. PATENT DOCUMENTS

| | | | |
|---|---|---|---|
| 4,272,758 | 6/1981 | Giraud | 340/310.02 |
| 4,629,259 | 12/1986 | Brauninger | 303/174 |
| 4,736,367 | 4/1988 | Wroblewski et al. | 370/85 |
| 4,899,338 | 2/1990 | Wroblewski | 370/276 |
| 5,689,421 | 11/1997 | Gornig | 701/45 |
| 5,808,555 | 9/1998 | Bartel | 340/825.31 |

FOREIGN PATENT DOCUMENTS 4441184  6/1995  Germany .

*Primary Examiner*—Michael J. Zanelli
*Attorney, Agent, or Firm*—Venable; George H. Spencer; Norman N. Kunitz

[57] ABSTRACT

In the case of a data transmission system for the exchange of digital data between a central processor unit and several peripheral control modules which are connected to the former by a bus system such that communication is enabled and which are provided for the purpose of activating one each, respectively, out of several safety devices such as airbags or belt tensioning systems, or similar devices, in a motor vehicle, and wherein these peripheral control modules are each provided with one buffer capacitor whose energy content is sufficient for operating the respective module, and the device driven by this module, within specifications over a limited period of time, the bus system is designed as a single wire system for the purpose of achieving a simple setup and reducing installation and fitting costs. In this single wire system the control modules are supplied with electrical operating energy, and digital data are transmintted, by the same line sections. In the data communications mode of the central processor unit and the control modules, the energy supply of the modules is effected by their buffer capacitors. The transmission of the digital data from the central processor unit to the control modules as well as the passing on of such data is effected by modulating a direct voltage whose maximum level $U_S$ is significantly lower than the maximum voltage level $U_B$ up to which the buffer capacitors can be recharged. The recharging of the buffer capacitors is effected in charge mode periods nested in between transmission operation phases of the central processor unit and the peripheral control modules.

16 Claims, 2 Drawing Sheets

DATA TRANSMISSION SYSTEM

BACKGROUND OF THE INVENTION

The invention concerns a data transmission system for the exchange of digital data between a central processor unit and several peripheral control modules which are connected to the former by a bus system such that communication is enabled and which are provided for the purpose of activating a respective one, out of several safety devices such as airbags, belt tensioning systems, roll-over bars, or for driving actuating elements within motor vehicle control systems such as anti-lock braking systems, anti-skid acceleration control systems, or engine management systems; these peripheral control modules are each fitted with one buffer capacitor whose energy content is sufficient for operating the respective module, and the device driven by this module, within specifications over a limited period of time—in the case of an airbag, for example, for a period of 200 ms approximately.

Standard data transmission systems of this type feature a data bus by means of which data communications between the central processor unit and the peripheral modules will be effected, as well as a supply bus by means of which the supply energy will be fed to the control modules and the devices they control.

If the routing and fitting costs involved in such a "double" bus system are to be reduced, "halved" as it were, by changing over to a "single wire" bus system—ground connections excepted—, within which data communications as well as the energy supply will be effected via the same bus system, any implementation of such a data transmission system will result in the problem that the transmitter stages of the central processor unit and the peripheral control modules must be able to drift against the capacitive loads of the buffer capacitors and therefore be designed for relatively high output power values, or—in the case of a data transmission by supply current modulation—on the one hand there will be the problem that increased requirements will need to be met with regard to the low resistance of the transmission lines in order to be able to detect reliably and recognize as data signals relatively minor changes in the current, and, on the other hand, that any changes in the charge state of the buffer capacitors caused by the changes in the current will lead to voltage signals which themselves need to be distinguishable from data signals; this requires additional circuitry in the control module area, in this way largely compensating any possible advantage that may have resulted from the simplification of the bus system; in some cases total effort and cost will even increase overall and thus produce an overcompensation effect.

SUMMARY OF THE INVENTION

Starting from the above premise, it is the object of the invention to provide a data transmission system of the type stated above which shall be improved to the extent that it can be implemented at a significantly lower degree of complexity and cost without detriment to a high functional reliability.

According to the invention the data transmission system—whose bus system is designed as a single wire system in which on the one hand the control modules are supplied with electrical operating energy, and in which on the other hand the digital data are transmitted, by means of the same line sections—will utilize the buffer capacitors as the source of energy for the control modules, at least in the transmission mode of the central processor unit and in the correlated data pass mode of the control modules, with the transmission of the digital data from the central processor unit to the control modules as well as the passing on of such data being effected by modulating a direct voltage whose maximum level is significantly lower than the maximum voltage level up to which the buffer capacitors can be recharged and where such recharging is effected in charge mode periods nested in between transmission operation phases of the central processor unit and the peripheral control modules. With regard to a more simple construction of the peripheral control modules and a lower power requirement of the same, the data transmission system according to the invention provides for the utilization of the obvious advantage of a single wire bus system afforded by the reduction in the installation and fitting costs; in particular, this advantage is quite considerable in the case of widespread use in road vehicle applications.

This applies when status information data are transmitted from the control modules to the central processor unit in accordance with the principle of total load current modulation as well as when information data are transmitted in accordance with the principle of direct voltage signal modulation at a reduced voltage level relative to the voltage level of the supply energy source; this reduced voltage level should best be that level which also controls the transmission of information data from the central processor unit to the control modules and the passing on of such data via the control modules.

In order to reduce as much as possible the load on the buffer capacitor of a module which is currently a in transmission mode, it is advantageous if the transmitter stage located at the reception end of the receiving module and/or the central processor unit will be switched into its high ohmic state, with the transmitter stages of the modules being appropriately implemented as tri-state output circuits.

In order to limit the charge current and avoid peak voltages, in particular at the start of buffer capacitor charging phases, by which the capacitors themselves or even other components of the control modules could be damaged, it is especially advantageous if a charge control device is provided which provides for the sequential charging of the control module buffer capacitors in an ordered sequence and which can be implemented quite simply by providing, in each control module, for a low ohmic charge current path as well as for a parallel higher ohmic charge current path, such that by means of these paths the buffer capacitor of each respective adjacent control module in the transmission system can be charged up. Here, during an initial charging phase of the respective buffer capacitor, both extending charge current paths are at first inhibited; after the capacitor in charging mode has reached an output voltage corresponding to a minimum level of stored energy, the higher ohmic extending charge current path will be enabled first, and after the capacitor—to which charging current is now applied via this charge current path—has taken up approximately ¼ of the total energy that it can store, the low ohmic second extending charge current path of the control module controlling the charge current will also be released; in this way, a release of charge current paths in line with requirements as well as a careful charging operation will be achieved.

In an implementation of these functions by means of a simple technical circuit, the higher ohmic charge current path can be enabled by switching over an electronic charge stage that will become conductive only if a signal is applied at a first control input of this charge stage, which indicates that the output voltage $U_C$ of the buffer capacitor has reached a minimum value, and if an output signal of a current sensor is applied at a second control input of the electronic switch, which output signal indicates that a minimum charge current flows via the low ohmic charge current path of the respective charging module and/or the central processor unit, where the signal fed to the first control input of the charge stage can be a comparator output signal which switches over to a defined—low or high—logical signal level as soon as the characteristic minimum charge voltage has been reached on the buffer capacitor.

The voltage signal applied to the center tap of a resistance voltage divider, which voltage is a measure for the output voltage of the supply current source, can be utilized as a second control input signal for the electronic charge control stage which—as it were—provides for the enabling of the higher ohmic charge path by means of the AND operation of this control input signal on the output signal of the comparator responding to the capacitor voltage.

Therefore, when the higher ohmic charge path is enabled it can be determined with certainty that the buffer capacitor—which will be in its first charging phase—is intact and that even the operating current source supplies enough current which will also get to the next capacitor to be charged up, via the low ohmic charge current path, as soon as an electronic switch that is inhibited in its non-driven state changes into its conductive state by means of the output signal of a comparator which the latter generates if the voltage on the capacitor that is in charging mode via the higher ohmic charge current path has exceeded a minimum value.

It is appropriate here that the electronic switch of the low ohmic charge current path is designed as a field effect transistor inhibited in its non-driven state and that the voltage threshold for the changeover into the conductive state is significantly lower than the capacitor voltage $U_C$; if the latter is exceeded, the higher ohmic charge current path will change into its conductive state.

In its turn, the data and supply output of the central processor unit can be inhibited by means of an electronic switch which is conductive in its non-driven state and inhibited in its driven state, with the latter being allocated to transmission operation; it is therefore appropriate that it is designed as a self-conductive field effect transistor. However, an implementation using a self-inhibiting field effect transistor—similar to or exactly the same as the ones provided for the control modules—is also possible.

In the voltage modulating transmission mode of the central processor unit as well as the peripheral control modules, the maximum signal level will be between 60% and 85%, preferably around 80%, of the output voltage level of the operating energy source.

BRIEF DESCRIPTION OF THE DRAWINGS

Further details of the data transmission system according to the invention are provided by the following description of a preferred embodiment example, using the drawing figures wherein.

DESCRIPTION OF THE PREFERRED EMBODIMENTS

Figure 1:
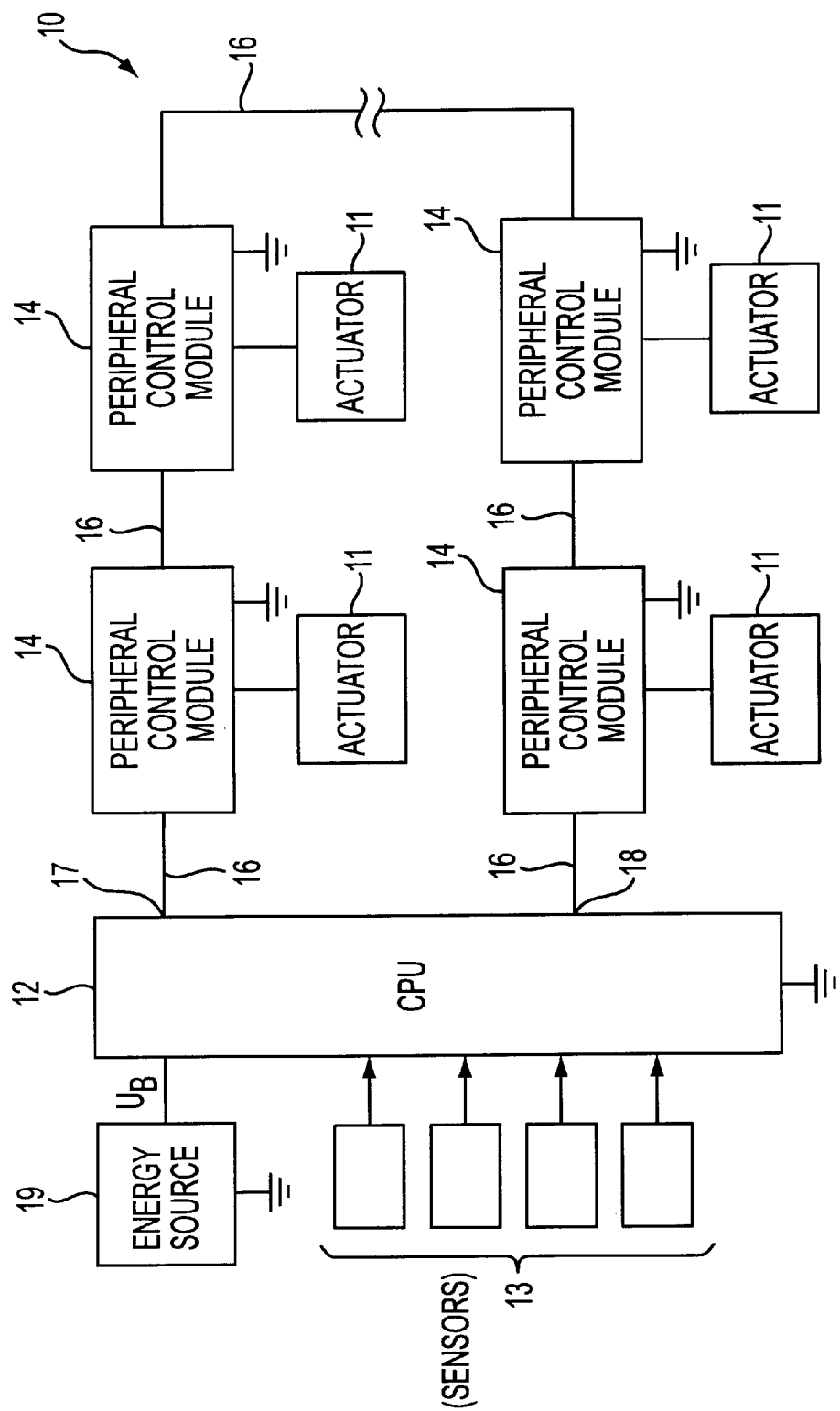
FIG. 1 is a schematically simplified block diagram of a data transmission system according to the invention complete with a single wire data and supply bus system.

The data transmission system—which has the overall designation 10 in FIG. 1–is used to control a large number of actuators 11, e.g, trigger devices for the protective devices in a motor vehicle such as airbags, belt tensioning systems, unfolding of roll-over bars and such like or the actuators for an individual brake pressure control on the various individual vehicle wheels in connection with an anti-lock braking system and/or a vehicle dynamics control system. The data transmission system comprises a central processor unit 12 which, from the processed output signals of sensors 13 (here illustrated schematically only), generates digital output signals characteristic for the dynamic behavior of the vehicle, as well as peripheral control modules 14—individually assigned to the actuators 11—which are connected to the central processor unit 12 by means of a bus system, represented in FIG. 1 by the bus lines 16, such that communication is enabled, and a processing of information data which are transmitted by the central processor unit 12 which information data will generate the control output signals required for driving the actuators 11.

In the embodiment selected for elucidating the invention, this bus system is designed as a ring bus system in which the control modules 14 are connected in series, as it were, between two data output and reception terminals 17 and 18 of the central processor unit 12 which on each of these terminals 17 and 18 is able to transmit data to be processed by the control modules 14 and to receive data, e.g., self-test or status data, that are transmitted from the peripheral modules 14 back to the central processor unit.

The bus system has been designed as a "single wire" system by means of which data communications between the central processor unit and the peripheral control modules 14, and among the latter themselves, as well as the supply of control modules 14 with electrical operating energy is effected; this electrical operating energy is provided by an "electrical" energy source 19, e.g., the vehicle battery, that is maintained at an essentially constant output voltage level $U_B$.

In order to enable this double utilization of the bus lines 16 as a data as well as a supply bus system, this data transmission system 10 is designed such that, on the one hand, data communications can take place bi-directionally also, and that the system is supplied with operating energy, on the other hand, at varying times, with supply time periods and data communication time periods being in an alternating time-nested sequence.

During data communication time periods the activated central processor unit 12, and the control module(s) 14 activated at the same time, will be supplied from these individually assigned "own" electrical energy accumulators 21 which will be re-charged during subsequent energy supply time periods.

Figure 2:
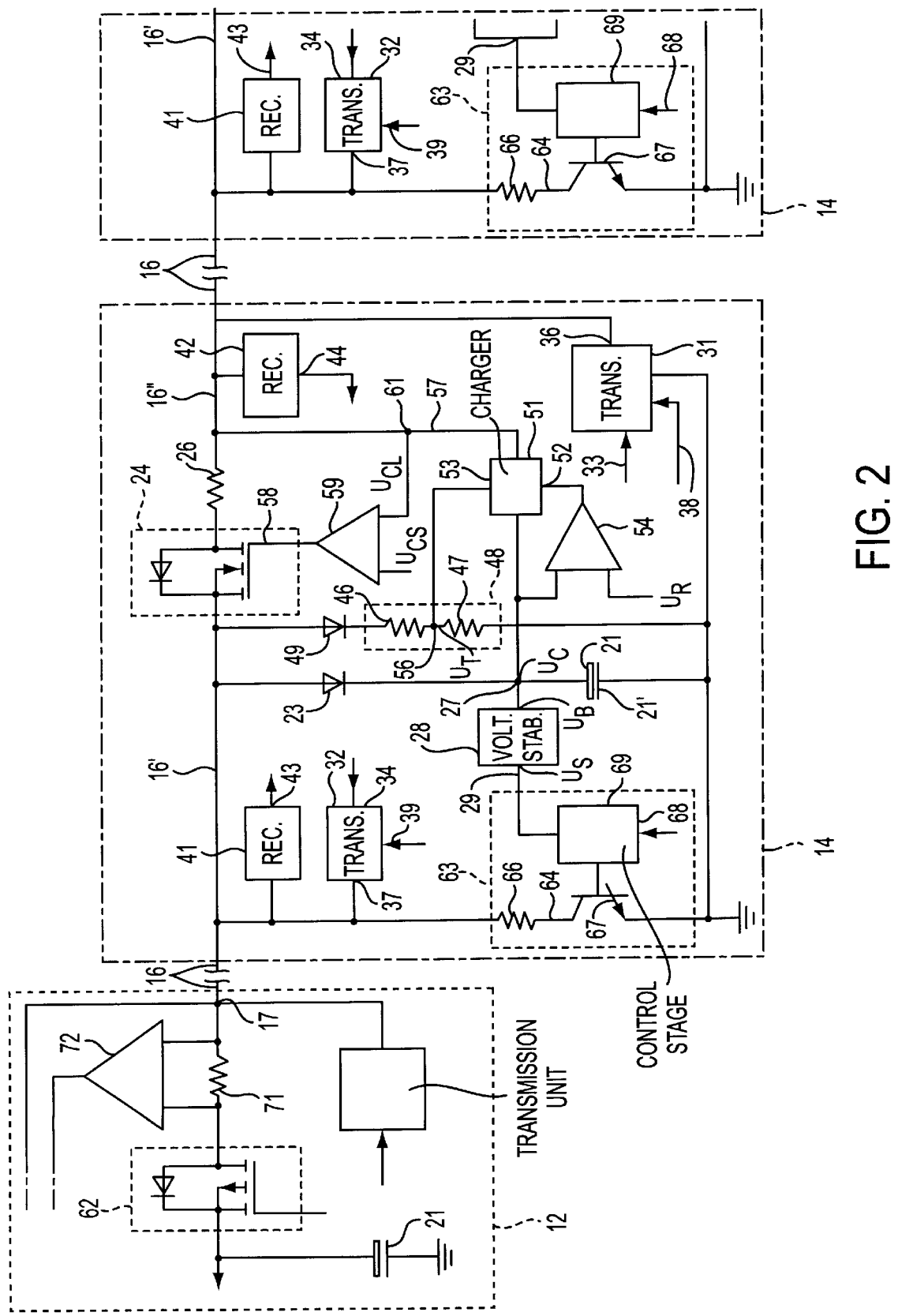
FIG. 2 shows details of the central processor unit (CPU), and a control module directly connected to this CPU, within a data transmission system according to FIG. 1.

In order to elucidate the technical circuitry details provided for this purpose in the central processor unit 12 and the control modules 14, the following now refers to FIG. 2. The central processor unit 12 and the control modules 14 are equipped with a buffer capacitor each as an electrical energy accumulator 21, which buffer capacitor—connected with its one electrode 21' to the potential of the circuit ground 22—is connected via a decoupling diode 23 to that module-internal section 16' of bus line 16 by means of which data signals transmitted by the central processor unit 12 and, if necessary, passed on by one or several control module(s) 14 are received.

Via this bus line section 16' close to the central processor unit 12, the buffer capacitor 21 of the respective control module can be charged up to the value of the output voltage $U_B$ assumed to be positive.

This module internal line section 16' close to the central processor unit is connected via an electrically driven electronic switch 24 to the module internal section 16" of bus line 16 remote from the central processor unit 12, by means of which data transmitted back to the central processor unit 12 from the next control module 14 can be received by the respective control module 14.

The electronic switch 24 is designed as a self-inhibiting field effect transistor (IG-FET), featuring a low RDSon value (RDSon=resistance in its conductive state), which changes into its conductive state by being driven with a positive control voltage $U_G$. In deviation from the IG-FET illustrated for the purpose of elucidation, the electronic switch 24 can also be implemented as a p-channel MOS FET.

A voltage stabilization stage 28 is connected to the center tap 27 between the buffer capacitor 21 and the blocking diode 23 by means of which the buffer capacitor 21 is connected to the section 16' of the bus line 16 close to the central processor unit; this voltage stabilization stage 28 provides a stabilized direct voltage $U_S$ at its output, if and for as long as the output voltage $U_C$ of the buffer capacitor 21 applied to the center tap 27 of the buffer capacitor/blocking diode path 21, 23 is greater than the voltage $U_S$ at output 29 of the stabilization stage 28 which will stabilize this output voltage $U_S$ to a value that—in a typical design of stabilization stage 28—will correspond to 80% of the output voltage $U_B$ of the central electrical energy source 19.

The output voltage $U_S$ of the voltage stabilization stage 28 will be utilized in the data reception and/or transmission mode of the respective control module 14 as an operating and reference voltage for the transmission units 31 and 32 of the control module 14, which are provided for the passing on of data to the next control module 14 further away from the central processor unit 12 (when seen from the central processor unit 12) or for re-transmitting ("returning") data to the central processor unit 12 or a control module 14 closer to the central processor unit 12.

In their base functions, these transmission units 31 and 32 are designed as tristate output circuits which can themselves be driven by digital drive signals, generated by the processing and/or control stages (not shown here) of the respective control module 14, such that when a high signal is applied to their control input 33 or 34, the output 29 of the voltage stabilization stage 28 will be connected to either the one or the other of the module internal bus line sections 16" or 16', and, when a low signal is applied to the control input 33 or 34 the module internal bus line sections 16" or 16' respectively connected to the output 36 or 37 of the respective transmitter stage 31 or 32 will be applied to the potential of the circuit ground 22, if in each respective case there is a high signal applied to a further (EN) control input 38 or 39, and the output 36 or 37 of the respective transmitter stage 31 or 32 becomes high ohmic, if the signal applied to the respective further control input 38 or 39 is a low signal.

With regard to the described transmission units 31 and 32, it is naturally also possible to implement transmission units with corresponding functionality in a design featuring a control logic that is inverted relative to the control logic described above.

A voltage divider with the overall designation 48 is connected in parallel to the buffer capacitor 21 of control module 14; this voltage divider 48 comprises two ohmic resistors 46 and 47 in series connection and can also be connected via a blocking diode 49 to the section 16' of bus line 16 close to the central processor unit.

The control modules 14 are fitted with a charge stage 51 providing a charge current limiting function by means of which charge stage 51, the buffer capacitor 21 of the respective adjacent control module 14 located further away from the central processor unit 12 can be charged up in the start-up phase of the charging operation via the control module 14 located closer to the central processor unit 12, where the buffer capacitor 21 of the latter control module 14 has already been charged up to a low energy content. A charge stage with corresponding functionality can also be provided in the central processor unit 12. The charge stage 51, whose circuit layout is not shown here for reasons of simplicity, can for instance be implemented as a series connection of an ohmic fixed resistor, complete with two electronically controlled switches, with such a connection being inserted between the center tap 27 of the capacitor/ diode path 21, 23 and the bus line section 16" of the respective control module 14 which is further removed from the central processor unit 12, and where these electronic switches are inhibited in their non-driven state and where the one switch can be driven into its conductive state by means of a control signal fed to the charge stage 51 at its first control input 52 and where the other electronic switch can also be driven into its conductive state by means of a control signal fed to the charge stage 51 at a second control input 53. The control signal fed to the charge stage 51 at its first control input 52 is the output signal of a comparator 54 which compares the voltage $U_C$ at the center tap 27 of the blocking diode/buffer capacitor path 23, 21 with a reference value $U_R$ which in an appropriate design of the control module 14 corresponds to half the value of the output voltage $U_S$ of the stabilization stage 28. The output signal of the comparator 54 is a low signal if the capacitor voltage $U_C$ is lower than the reference voltage $U_R$, and it is a high signal if the capacitor voltage $U_C$ is higher than the reference voltage $U_R$. The second control signal fed to the charge stage 51 at its second control input 53 will be the voltage $U_T$ applied to the center tap 56 of the resistor voltage divider 48; this voltage $U_T$—as a second condition for the relatively high ohmic charge current path (designated overall as 57) becoming conductive—must correspond to a minimum value which is sufficient to indicate that the voltage $U_B$ applied to a block diode 49 pre-connected to the voltage divider 48 is significantly higher than the output voltage $U_S$ of the stabilization stage 28. To this extent, this voltage comparison enables a functionality test of the central operating energy source 19, the central processor unit 12, and, if necessary, further control modules 14 which are technically connected into the circuit and located in between the central processor unit 12 and the respective control module 14 which currently drives the charge-up operation of the buffer capacitor 21 for the next control module. In an appropriate design of the charge stage 51, the analog voltage output signal $U_T$ of the resistance divider 48 can also be utilized to provide for a variable control of the resistor effective in the charge current path 57.

The control (gate) connection 58 of the self-inhibiting transistor 24 will be fed the output signal of a further comparator 59 which will compare the voltage $U_{CL}$— currently applied to the output 61 of the charge stage 51 and provide a measure for the charge state of the capacitor 21 to be charged up—with a threshold value $U_{CS}$ characteristic for the minimum charge of the above capacitor 21, and which will, as soon as this threshold value $U_{CS}$ is exceeded, emit a high signal by means of which the field effect transistor 24 is driven into its conductive state in which a charge current flows to the buffer capacitor 21 of the next control module 14 that is to be charged up next. An appropriate value for the comparative voltage $U_{CS}$ at which the field effect transistor 24 is driven into its conductive state would be ¼ of the output voltage $U_S$ of the voltage stabilization stage 28.

To provide a qualitative description and explanation of the interaction of the control modules 14 (whose technical circuit layout has already been described above) in the charge phases of their buffer capacitors 21, a situation is to be assumed in which all buffer capacitors 21 need to be re-charged; this may be the situation, for example, in which a vehicle equipped with the data transmission system 10 is taken into service. In addition, it is to be assumed that the output voltage $U_B$ of the central electrical energy source 19 is applied to terminal 17 of the central processor unit 12 and thus also to the bus line section 16' close to the former, that is, charging the buffer capacitor 21 of the first control module 14 has already commenced but the increasing voltage $U_C$ that can be tapped at the center tap 27 of the capacitor/diode path 21, 23 is still lower than the comparative value $U_R$' to which it is compared by means of comparator 54 and whose output signal will thus be a low signal (0 volts). The central processor unit 12 also provides for a charge stage with corresponding functionality; however, for reasons of simplicity this will not be shown here. Although in this situation the output voltage $U_T$—tapped at the center tap 56 of the resistance voltage divider 48—will already be applied to the second control input 53 of the charge stage 51 at the level required for activating the said charge stage 51, the high ohmic charge current path 57 leading from the center tap 27 of the buffer capacitor/blocking diode path 21, 23 via charge stage 51 to the buffer capacitor 21 of the post-connected "second" control module 14 will not yet be released as the low output signal of the comparator 54 is still applied to the first control input 52 of charge stage 51. Therefore, the output signal of the comparator 59 provided for driving the self-inhibiting field effect transistor 24 will also be a low signal, and the field effect transistor 24 is in its inhibited state. This also applies to the field effect transistors 24 of the other control modules 14. As soon as the voltage $U_C$ on the buffer capacitor 21 of the first control module 14 reaches the comparative value $U_R$, and its output signal changes over to the high level, in this way activating charge stage 51 and releasing charge current path 57, the charge operation for the buffer capacitor 21 of the second control module 14 will commence even whilst the transistor switch 24 of the first control module is still inhibited. In this phase of the charge operation the voltage that can be tapped on the buffer capacitor 21 of the second control module 14—for which voltage the voltage $U_{CL}$ that can be tapped at output 61 of the charge stage 51 provides a measure—will follow at a time-delayed interval the voltage $U_C$, developing in line with the charging of the buffer capacitor 21 of the first control module 14; in this phase the voltage $U_T$ that can be tapped at the center tap 56 of the voltage divider 48 for the second control module will be lower than the minimum value required for activating the charge stage 51 of the second control module 14.

As soon as the voltage $U_{CL}$—that can be tapped at output 61 of the charge stage 51 for the first control module 14 and which essentially corresponds to the voltage $U_C$ across the buffer capacitor 21 of the second control module 14—corresponds to the relevant comparative value $U_{CS}$ for the further comparator 59, and as soon as the field effect transistor 24 of the first control module 14 is driven into its conductive state by means of the associated high output signal of this comparator 59, the bus line 16 which connects the second control module 14 with the first control module 14 will also be connected to output 17 of the central processor unit 12 or the central electrical energy source 19 such that its output voltage $U_B$—with the exception of a minor voltage drop across the field effect transistor 24 of the first control module 14—will now also be utilized for charging the buffer capacitor 21 of the second control module 14, and the same charge operation phase will be reached on the second control module 14 that provided the basis for the description of the charge operation for the first control module 14.

The sequence in time for the charging phases of the buffer capacitors 21 described above, using as an example the first and second control modules 14 of the data transmission system 10 in accordance with FIG. 1, will result qualitatively in the same way for any control module 14 pairs arranged in sequence within the bus system; thus, these control modules 14 will effect an automatic charging of their buffer capacitors according to actual requirements and within the scope of a time staggered sequential control system.

Charging the buffer capacitor 21 of the central processor unit 12 will also be effected in complete analogy to the way the buffer capacitors 21 of the control modules 14 are charged up (as described by means of FIG. 2). However, the difference to these is that the output voltage of the central energy supply source 19 is applied to the output 17 of the central processor unit 12, via a self-conductive field effect transistor 62 which is driven into its inhibited state by means of a control signal initiating the start of a data transmission operation of the system 10; thereafter the energy requirements of the various functional units of the control modules 14 are covered by their buffer capacitors 21.

In addition to the return transmission units 32 which operate by modulating the output voltage $U_S$ of the module internal voltage stabilization stages 28, the embodiment example selected for description and elucidation also provides for return transmission stages 63 to be used for re-transmitting data from the control modules 14 to the central processor unit 12, which operate by modulating a load current flowing—if the electronic switch 62 of the central processor unit 12 is in its conductive state—across the voltage divider 48 of the first control module 14 connected directly to the central processor unit 12 as well as across those further voltage dividers 48 which are connected in parallel to the first-named voltage divider by means of the electronic switches 24 in the bus system when these are in their conductive state.

These return transmission units 63 are formed by means of a respective modulation current path 64 each connected in parallel to the voltage divider 48 or the capacitor/diode path 21, 23 of the relevant control module 14; this modulation current path can be electronically controlled, inhibited, and released, and comprises an ohmic fixed resistor 66 as well as a switching transistor 67 connected in series to the ohmic fixed resistor 66, which switching transistor can be driven into its conductive or inhibited state by the cycle of the data signals received at input 68 of its control stage 69. If there are any changes in the total load current flowing via the electronic switch 62 and a sensor resistor 71 of the central processor unit 12, that occur within the cycle of the data signals, these will be detected by means of the voltage drop changes across the sensor resistor 71, that can be determined using a differential amplifier of the central processor unit 12, and thus utilized to receive the data transmitted by current modulation.

In principle, it suffices naturally if the control modules 14 are provided either with return transmission units 32, operating on the basis of voltage modulation, or with return transmission stages 63 that operate on the basis of current modulation; and thus, correspondingly, it suffices also if the central processor unit 12 is fitted either with a receiver stage evaluating the voltage level only, or with a receiver stage responding to and evaluating the current modulation.

It is clear that a data transmission system according to the invention, of the type described by means of a ring bus system and complete with control modules 14, can also be implemented as a stub system (star bus system).

What is claimed is:

1. A data transmission system for the exchange of digital data between a central processor unit and several peripheral control modules which are connected to the central processor unit by a bus system such that communication is enabled and which are provided for the purpose of one of activating a respective one of several safety devices and driving actuating elements within motor vehicle control systems and the peripheral control modules are each fitted with a respective buffer capacitor whose energy content is sufficient for operating the respective peripheral control module, and the device or element driven by the respective peripheral control module, within specifications over a limited period of time, wherein:

(a) the bus system is a single wire system in which the peripheral control modules are supplied with electrical operating energy, and in which the digital data are transmitted, by common line sections of the single wire system, (b) at least in a transmission mode of the central processor unit and in a correlated data pass mode of the peripheral control modules, the energy supply of the peripheral control modules is effected by their respective buffer capacitors, and furthermore (c) the transmission of the digital data from the central processor unit to the peripheral control modules as well as the passing on of such data is effected by modulating a direct voltage whose maximum level ($U_S$) is significantly lower than the maximum voltage level ($U_B$) up to which the buffer capacitors can be recharged, and (d) such recharging of the buffer capacitors is effected in charge mode periods nested in between transmission operation phases of the central processor unit and the peripheral control modules.

2. Data transmission system according to claim 1 wherein the transmission of data signals from the peripheral control modules to the central processor unit is effected by modulating a total load current.

3. Data transmission system according to claim 2 wherein the transmission of data signals from the peripheral control modules to the central processor unit is effected by modulating a direct voltage whose maximum level is lower than the level of the direct voltage supply.

4. Data transmission system according to claim 3 wherein, in the transmission mode of one of the peripheral control modules, a transmission stage located at a reception end of one of a receiving different peripheral control module and the central processor unit is switched into a high ohmic state.

5. Data transmission system according to claim 2 wherein, in the transmission mode of one of the peripheral control modules, a transmission stage located at a reception end of one of a receiving different peripheral control module and the central processor unit is switched into a high ohmic state.

6. Data transmission system according to claim 5 wherein a charge control device is provided which effects a charging of the buffer capacitors for the peripheral control modules in an ordered sequence.

7. Data transmission system according to claim 6 wherein there is a provision, in each peripheral control module, for a low ohmic charge current path as well as for a parallel higher ohmic charge current path, such that by these paths the buffer capacitor of each respective adjacent peripheral control module in the transmission system can be charged up, with both charge current paths that extend to the respective adjacent peripheral control module being at first inhibited during an initial charging phase of the respective buffer capacitor of a particular peripheral control module; and subsequently, after the buffer capacitor of the particular controlling module has been charged up to reach a first minimum value of stored electrical energy, the higher ohmic extending charge current path of the particular peripheral control module becomes conductive first, and after the buffer capacitor of the adjacent peripheral control module, to which charging current is now applied via this higher ohmic charge current path, has taken up a minimum level of the total energy that it can store, the low ohmic charge current path of the particular peripheral control module will be released.

8. Data transmission system according to claim 7 wherein the higher ohmic charge current path is enabled by switching over an electronic charge stage that becomes conductive only if a signal is applied at a first control input of this charge stage, which indicates that an output voltage $U_C$ of the respective buffer capacitor has reached a minimum value, and if an output signal of a current sensor is applied at a second control input of the charge stage, which output signal indicates that a minimum charge current flows via the low ohmic charge current path of the respective one of peripheral charging module and the central processor unit.

9. Data transmission system according to claim 8 wherein the signal fed to the first control input of the charge stage of the higher ohmic charge current path is a comparator output signal which switches over to a defined signal level as soon as a characteristic minimum charge voltage has been reached on the buffer capacitor.

10. Data transmission system according to claim 9 wherein the signal fed to the second control input of the charge stage for the higher ohmic charge current path is the voltage signal applied to the center tap of a resistance voltage divider, which signal is a measure for the output voltage of the supply current source.

11. Data transmission system according to claim 10 wherein the low ohmic charge current path leads via an electronic switch, inhibited in its non-driven state, which changes into its conductive state by an output signal of a comparator indicating that the voltage on the buffer capacitor, in the charging mode via the higher ohmic charge current path, has reached a minimum value.

12. Data transmission system according to claim 11 wherein the electronic switch of the low ohmic charge current path is a self-inhibiting field effect transistor.

13. Data transmission system according to claim 12 wherein the voltage threshold at which the electronic switch of the low ohmic charge current path changes into its conductive state corresponds to half the value of the voltage $U_C$ at which the high ohmic charge current path changes into its conductive state.

14. Data transmission system according to claim 13 wherein the data and supply output of the central processor unit can be locked against the energy supply source by an electronic switch which is conductive in its non-driven state and inhibited in its driven functional state assigned to the transmission operation for the control modules.

15. Data transmission system according to claim 14 wherein the maximum signal level during transmission operation is between 60% and 85% of the supply voltage level $U_B$.

16. Data transmission system according to claim 15 wherein the maximum signal level during transmission operation is around 80% of the supply voltage level $U_B$.

* * * * *